US007809536B1

(12) United States Patent
Browning et al.

(10) Patent No.: US 7,809,536 B1
(45) Date of Patent: Oct. 5, 2010

(54) MODEL-BUILDING INTERFACE

(75) Inventors: Duke P. Browning, Austin, TX (US); Francis X. Sullivan, Round Rock, TX (US)

(73) Assignee: Motive, Inc., Austin, TX (US)

( * ) Notice: Subject to any disclaimer, the term of this patent is extended or adjusted under 35 U.S.C. 154(b) by 770 days.

(21) Appl. No.: 10/955,350

(22) Filed: Sep. 30, 2004

(51) Int. Cl.
*G06G 7/48* (2006.01)
*G06F 11/00* (2006.01)
(52) U.S. Cl. .......................................... 703/6; 714/100
(58) Field of Classification Search ...................... 703/6; 714/47, 100
See application file for complete search history.

(56) References Cited

U.S. PATENT DOCUMENTS

| 6,721,942 | B1* | 4/2004 | Sievert | 717/137 |
|---|---|---|---|---|
| 7,120,899 | B1* | 10/2006 | Sievert | 717/116 |
| 2003/0110421 | A1* | 6/2003 | Kurinami et al. | 714/47 |
| 2003/0195962 | A1* | 10/2003 | Kikuchi et al. | 709/226 |
| 2004/0093331 | A1* | 5/2004 | Garner et al. | 707/3 |
| 2004/0161796 | A1* | 8/2004 | Gustafsson et al. | 435/7.1 |
| 2005/0273763 | A1* | 12/2005 | Bendsen et al. | 717/120 |
| 2007/0112714 | A1* | 5/2007 | Fairweather | 706/46 |

OTHER PUBLICATIONS

Sztipanovits et al., Multigraph: An Architecture for Model-Integrated Computing, Feb. 1999.*

* cited by examiner

*Primary Examiner*—Paul L Rodriguez
*Assistant Examiner*—Andre Pierre Louis
(74) *Attorney, Agent, or Firm*—Hitt Gaines, PC

(57) ABSTRACT

A method, system, computer system, and computer-readable medium to provide an interface for defining a model of a particular functionality of an information processing system. Intelligent models can be defined that can be used by an application to discover actual relationship, dependency, or configuration data for components of an information processing system. Models can be defined to include a set of one or more instructions to discover data about an existing information system, where the data are related to the specific information processing function being modeled. Models provide a context for analyzing and evaluating the functionality of an information processing system. The interface can also be used to define the model itself, including components of the model, properties of the components, and relationships between components.

19 Claims, 15 Drawing Sheets

Model-Guided Application Flow

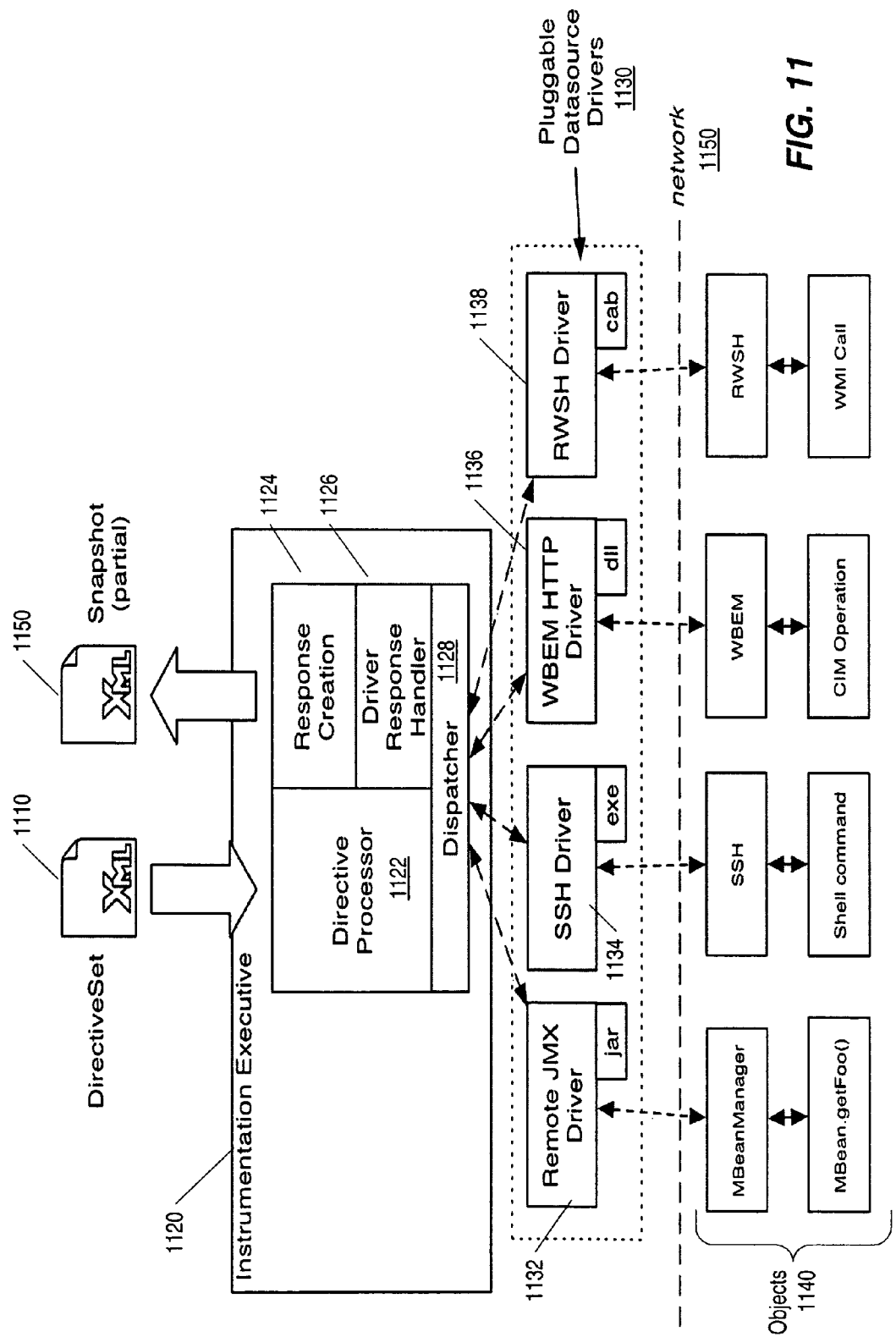

MODEL-BUILDING INTERFACE

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

This invention relates to discovery and modeling of hardware and software in a digital environment.

2. Description of the Related Art

A digital ecosystem is the complex, distributed, interconnected, heterogeneous elements of software applications, frameworks, protocols, toolkits, hardware processors, storage systems, networking routers, gateways, firewalls, and so on that make up a given information technology infrastructure (also referred to as an information processing system). The elements, relationships and technologies of a digital ecosystem are constantly changing, and are required to change, because of explicit or implicit dependencies on the rest of the world. The biggest influencers of digital ecosystems are usually not even considered to be a part of the ecosystem—that is, the people who own or manage one or more aspects of the ecosystem, who are driven by their own subjective desires, needs, goals, whims, and economics.

Managing such complex information technology infrastructures involves answering questions such as the following: How do you control one of these ecosystems? How do you manage it? How can you use it? How can you change it? How can you make it better? And perhaps most important, how can you extract value from it? One approach is to classify it: Catalog it. Document it. Diagram it. Create an organized taxonomy. Group like things together, and separate unlike things. But "like" in what way? Physical likeness? Vendor likeness? Technology likeness? Location likeness? Business application likeness? Presentation likeness? No universal classification scheme exists that can be used to create organized taxonomic hierarchies of every information technology infrastructure. Even if there were such a universal classification scheme, knowing what something is diminishes in importance when compared to knowing what it does—what it produces, consumes, controls or stores. And in most situations, knowing what something does is not sufficient without knowing what purpose it serves—Why is it necessary? What role does it play? What value does it enable?

An important prerequisite in managing a digital ecosystem is an understanding of which aspects of the ecosystem are relevant to the goals to be accomplished. Models can be used to allow people to specify the components and specific properties of components that are important within an ecosystem to achieve specific goals. Models provide a context in which data about the ecosystem can be interpreted, so that the data can be used for making decisions, performing operations, and implementing changes to the ecosystem.

However, in the diverse, complicated technology infrastructures in existence today, many complex subsystems interact to form a given information technology infrastructure. In such environments, a single model is typically unable to capture the complexity of such information processing systems. The models that do exist tend to capture data with regard to a single subsystem, and models typically are not compatible with one another. Furthermore, most models require data not readily available that must be gathered manually, which is a time-consuming process.

A solution is needed that enables the visualization, analysis, and operational automation of a complex information processing system. Preferably, the solution will provide the capability to model different functional aspects of a complex, heterogeneous information processing environment with multiple technological and informational goals. Preferably, the collection of data in an existing information system can be automated to facilitate the use of the same models in many heterogeneous information processing environments.

SUMMARY OF THE INVENTION

The present invention provides a method, system, computer system, and computer-readable medium to provide an interface for defining a model of a particular functionality of an information processing system. Intelligent models can be defined that can be used by an application to discover actual relationship, dependency, or configuration data for components of an information processing system. Models can be defined to include a set of one or more instructions to discover data about an existing information system, where the data are related to the specific information processing function being modeled. Models provide a context for analyzing and evaluating the functionality of an information processing system. The interface can also be used to define the model itself.

Defining a model includes defining a set of one or more components making up an information processing system. For example, a model of an information processing system can include one or more components in the form of computer systems. Each of these component computer systems includes various hardware and/or software resources, and the components may be connected via one or more network resources. Some components can serve as clients of other server components for particular functionality within the information processing system. The set of components of the model performs an information processing function. For example, the set of components may be configured to provide a particular application program or service, such as a customer database or a payroll processing system.

Defining the model further includes defining one or more properties of individual components within the set of components, where a property describes an attribute of a component. Particular properties of components can be related to performing the information processing function. For example, an information processing system to provide a database may include at least one component (e.g., a computer) with the properties needed to function as a database server. These properties may include, for example, a minimum amount of memory, a particular version of database server software, and so on. Defining the model also includes defining a set of one or more instructions to discover data about one or more resources in an existing information processing system. The data about resources can be related to a property of one or more components. For example, a set of instructions may be defined to determine whether any of the computer systems in an existing information processing system are configurable as database servers.

BRIEF DESCRIPTION OF THE DRAWINGS

The present invention may be better understood, and its numerous objectives, features and advantages made apparent to those skilled in the art by referencing the accompanying drawings.

FIG. 11 shows an example implementation of an instrumentation framework in accordance with one embodiment of the invention.

The use of the same reference symbols in different drawings indicates similar or identical items.

DETAILED DESCRIPTION

Figure 1A:
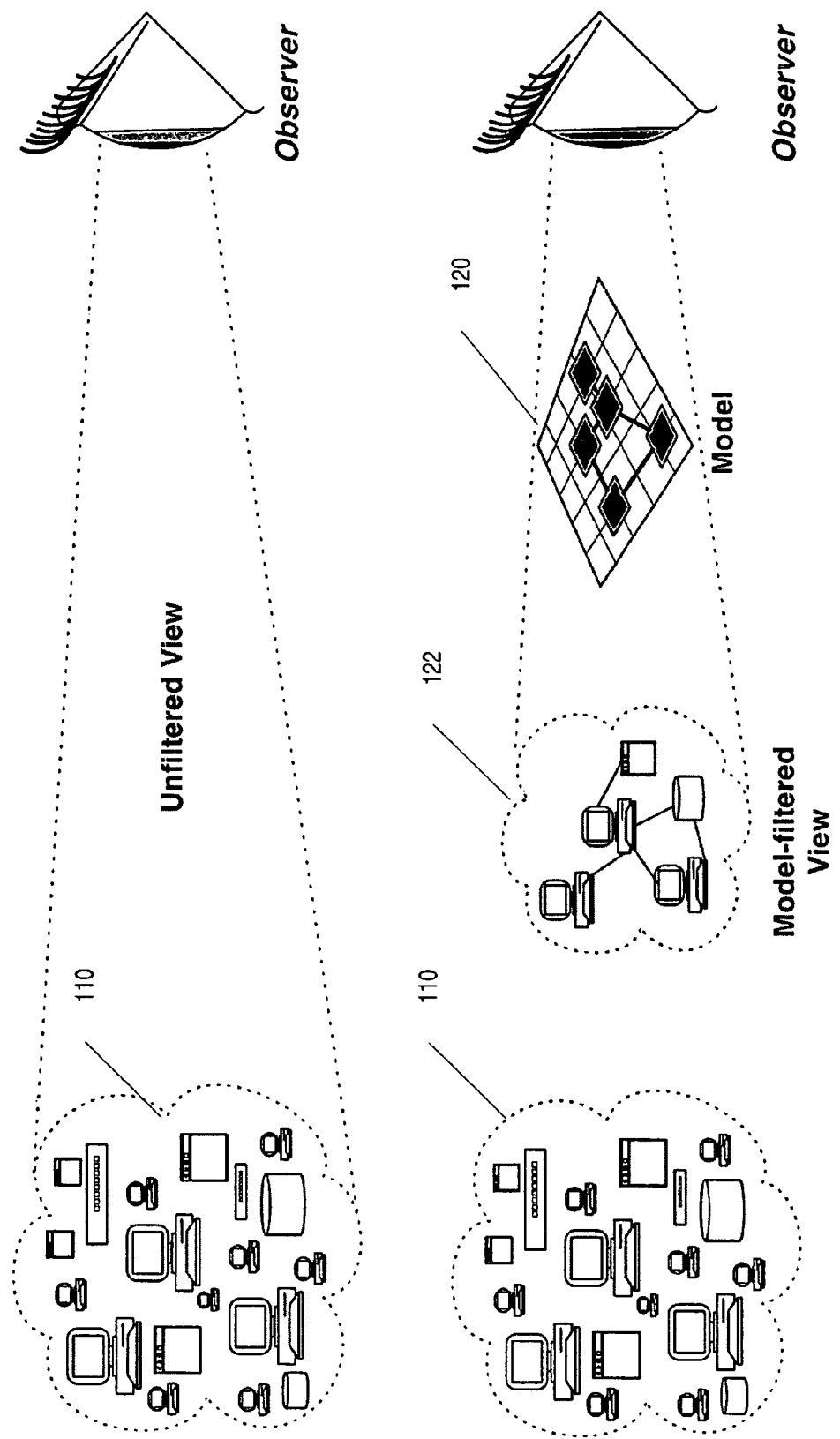
FIG. 1A shows views of an information processing system with and without a model.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" mean that a particular feature, structure, or property described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not other embodiments.

Introduction

Defining a model includes defining a set of one or more components making up an information processing system. For example, a model of an information processing system can include one or more components in the form of computer systems. Each of these component computer systems includes various hardware and/or software resources, and the components may be connected via one or more network resources. Some components can serve as clients of other server components for particular functionality within the information processing system. The set of components of the model performs an information processing function. For example, the set of components may be configured to provide a particular application or service, such as a customer database or a payroll processing system.

Defining the model further includes defining one or more properties of individual components within the set of components, where a property describes an attribute of a component. Particular properties of components can be related to performing the information processing function. For example, an information processing system to provide a database may include a component (e.g., a computer) with the properties needed to function as a database server. These properties may include, for example, a minimum amount of memory, a particular version of database server software, and so on.

Defining the model also includes defining a set of one or more instructions to discover data about one or more resources in an existing information processing system. These sets of instructions are also referred to herein as commands and/or directives. The data to be discovered about resources can be related to a property of one or more components. For example, a set of instructions may be defined for the properties needed to determine whether any of the computer systems in an existing information processing system are configurable as database servers.

A model can be considered to provide an application definition by defining components needed to deploy a given application. Different models may be developed for different types of implementations. For example, a "minimum deployment" model may specific the minimum components to manage, change, upgrade, and/or deploy an instance of an application, whereas a "performance" model may specify components and properties needed to determine if a deployment will provide optimum performance.

FIG. 1A shows a view of an information processing system with and without a model. With the unfiltered view, the observer sees an environment 110 including a collection of hardware without order. Moreover, the observer sees all hardware in environment 110, whether or not that hardware is relevant to the observer's system.

With model 120 as a filter, the observer sees the same environment 110 as model-filtered view 122. Model 120 shows hardware relevant to the purpose of the model and relationships between those hardware elements. Not all hardware elements of environment 110 are seen by the observer because those hardware elements are not relevant to the purpose of model 120. A model can be thought of as providing a particular perspective of the environment; typically, this perspective is with reference to a particular application or service.

Figure 1B:
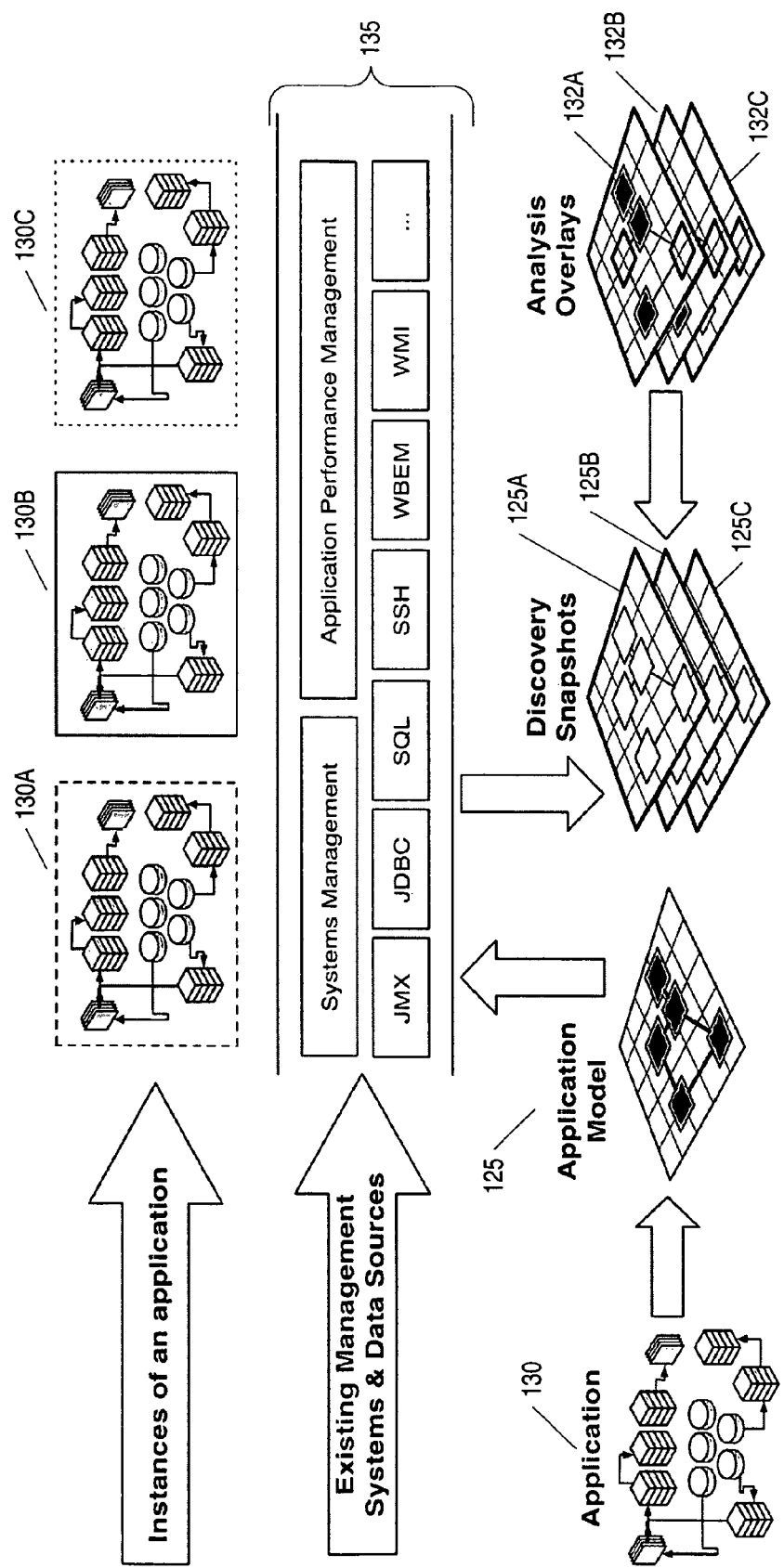
FIG. 1B shows an environment with multiple instances of a single application; existing management systems and data sources; and relationships between an application, a model/application definition, discovery snapshots, and analysis overlays.

FIG. 1B shows one or more environments with one or more instances of an application and existing management systems and data sources. FIG. 1B also shows relationships between an application and a model/application definition and introduces discovery snapshots and analysis overlays. Three instances of application 130 are shown, instances 130A, 130B, and 130C. Model/application definition 125 defines components of a model for the functionality provided by application 130, including defining how data are aggregated to form components. Model/application definition 125 is used to query existing management systems and data sources 135 to produce discovery snapshots 125A, 125B, and 125C, respectively, which are collections of discovered data about application instances 130A, 130B, and 130C. Snapshots 125A, 125B, and 125C are analyzed using overlays 132A, 132B, and 132C, which can be implemented as sets of instructions to analyze snapshots of existing information systems. Actions specified in overlays 132A, 132B, and 132C are performed as a result of these analyses.

Figure 1C:
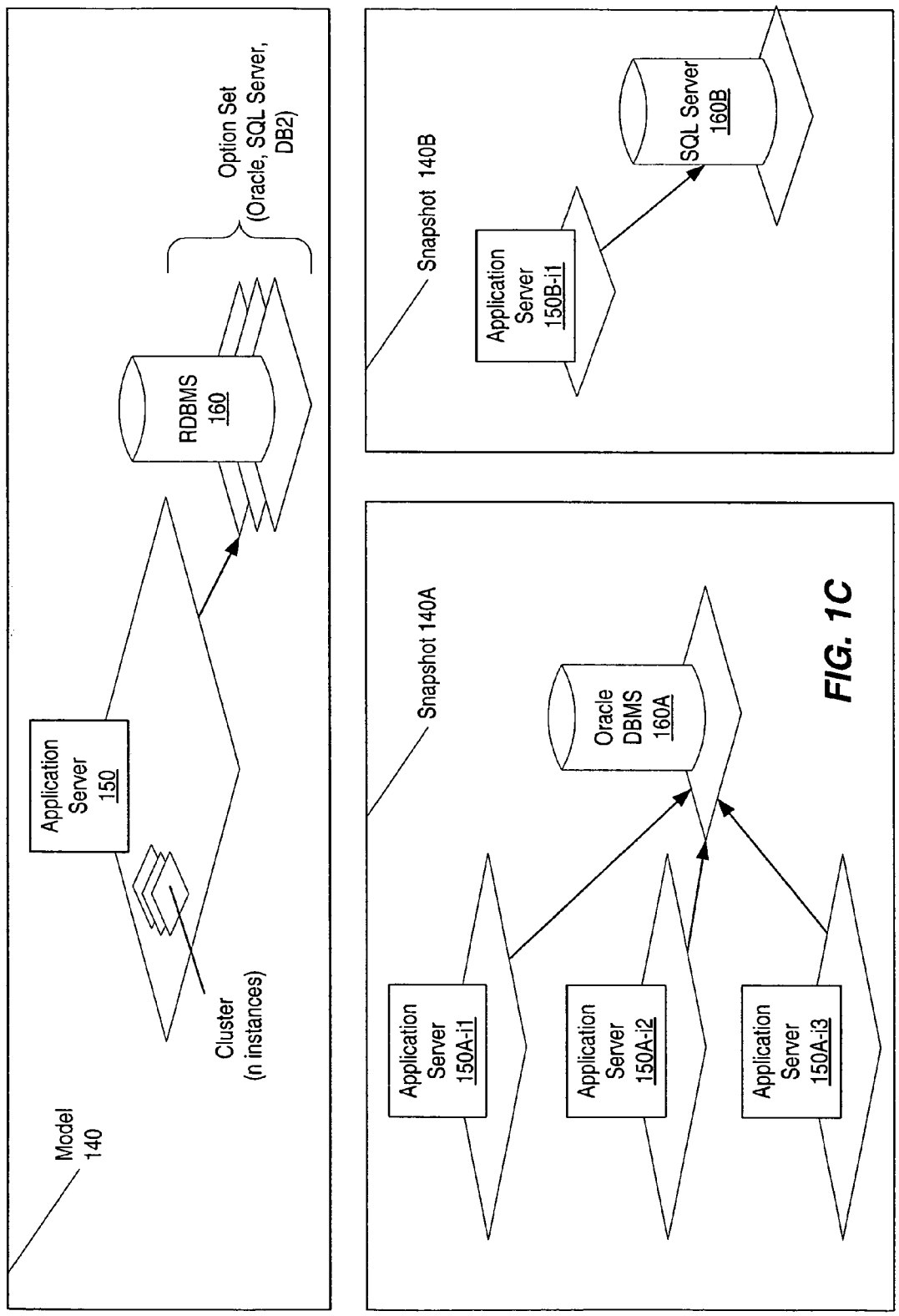
FIG. 1C shows an example of a model and snapshots of the model taken in different information processing systems.

FIG. 1C shows an example of a model 140 and snapshots 140A and 140B of model 140 taken in different information processing systems. Model 140 represents what the information processing system may include ("what could be"); for example, a model can define multiple configuration options for server components to provide a particular application, such as a customer database. In contrast, snapshots 140A and 140B represent what the respective information processing systems do include ("what is"). For example, a snapshot provides a specific number of server components that are actually deployed in a given implementation.

In FIG. 1C, model 140 includes an application server 150 in the form of a cluster, which can include multiple instances of application server 150. Model 140 also includes a relational database management system (RDBMS) 160, which includes one of several types of RDBMSs. Application server 150 and RDBMS 160 of model 140 are referred to as components of model 140. Defining a component as a cluster, such as application server 150, specifies that the component can have multiple instances. Defining a component as an option set, such as RDBMS 160, specifies that the component can have an instance selected from a set of options, such as the options of Oracle, SQL Server, and DB2.

After performing discovery on one environment, snapshot 140A includes three instances of application server 150: application server 150A-i1, application server 150A-i2, and application server 150A-i3. The option determined to exist for the option set for RDBMS 160 is an Oracle RDBMS, represented by Oracle DBMS 160A. Discovery on a different environment produces snapshot 140B, which includes one instance of application server 150, application server 150B-i1. In snapshot 140B, SQL Server 160B is the option determined to exist for an instance of RDBMS 160.

Figure 2A:
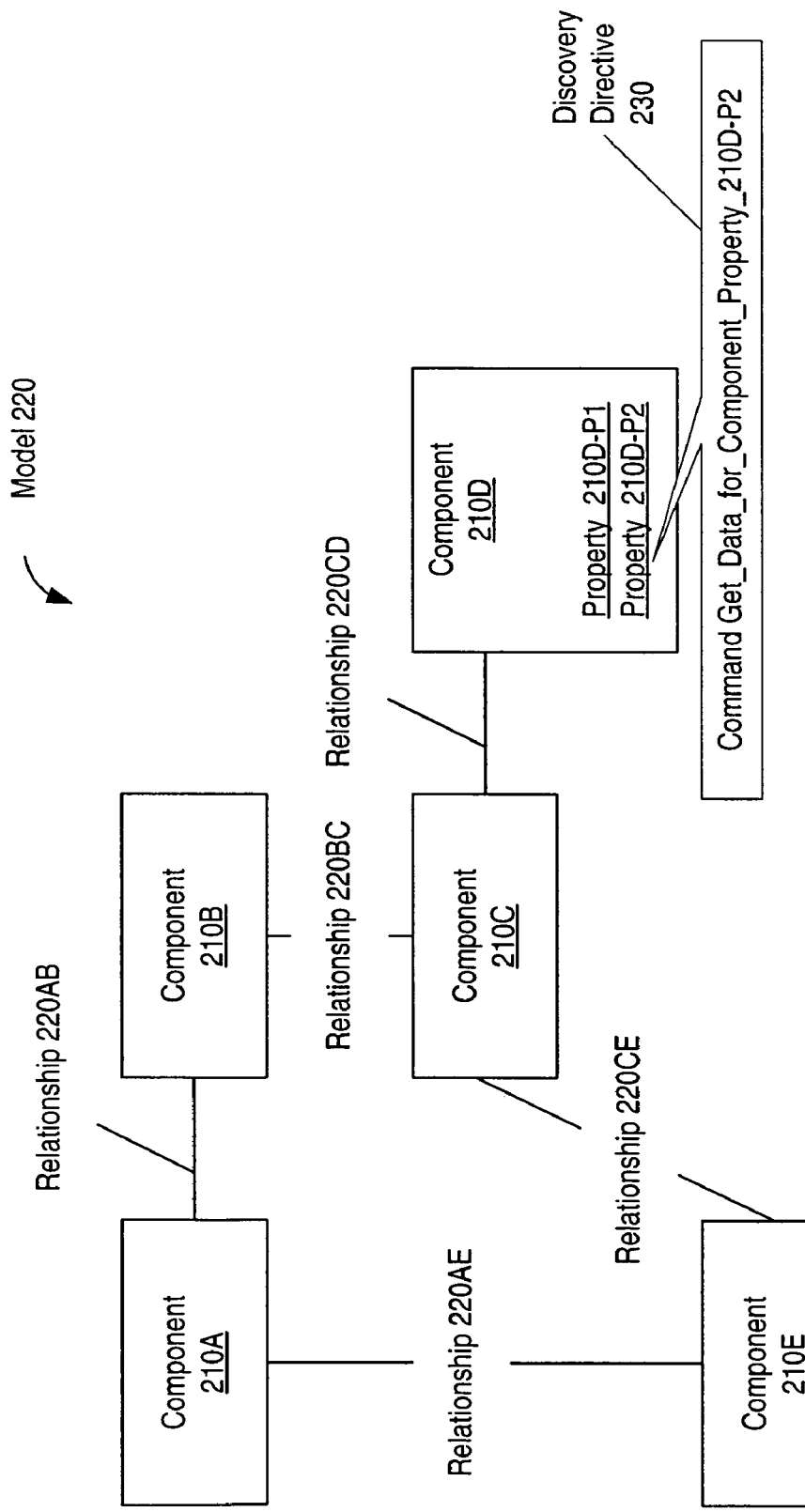
FIG. 2A is a block diagram to illustrate components of a model.

FIG. 2A is a block diagram to illustrate a model. Model 220 includes components 210A, 210B, 210C, 210D, and 210E. These components represent the hardware or software elements of the information processing system, such as an application server, web server, or database. Relationships can exist between components; for example, relationship 220AB is the relationship between components 210A and 210B. Similarly, relationships 220AE, 220BC, 220CD, and 220CE are shown between respective components. For example, the RDBMS 160 of FIG. 1B is used by application server 150; therefore a "uses" relationship exists between application 150 and RDBMS 160.

Components are defined as having attributes, also referred to as properties. Relationships can also have properties. In the example shown, component 210D has two properties, Property_210-P1 and Property_210-P2. Property_210-P2 has an associated discovery directive, labeled discovery directive 230, which provides instrumentation in the form of a set of instructions for discovering data about Property_210D-P2. Discovery directive 230 has the name of a set of instructions, Get_Data_for_Component_Property_210D-P2, which can be used to obtain a value for Property_210D-P2. Discovery directives are discussed in further detail below.

Figure 2B:
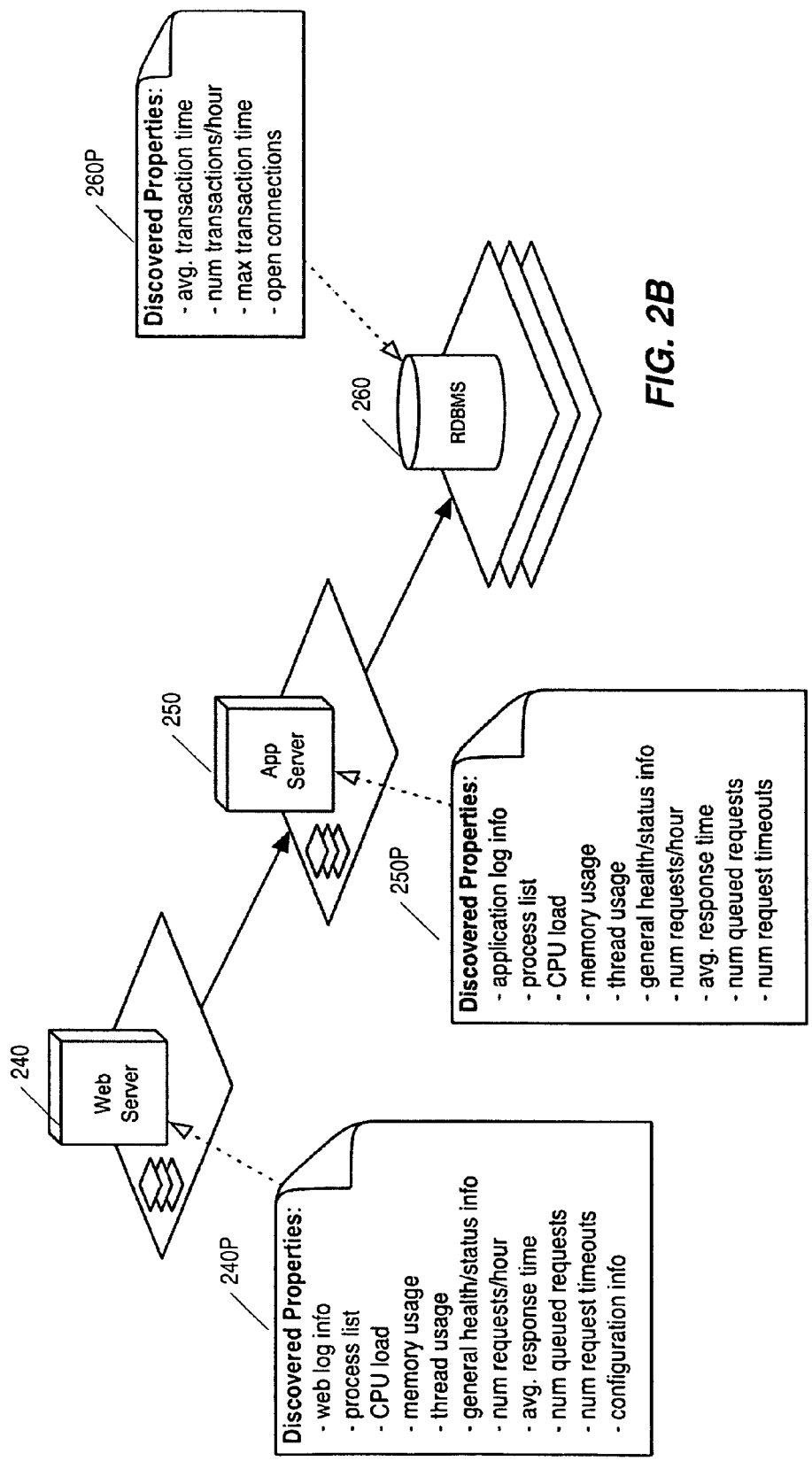
FIG. 2B shows examples of properties of components of a model.

FIG. 2B shows examples of discovered properties of components of a model. Web server 240 has discovered properties 'web log info,' 'process list,' 'CPU load,' and so on, as shown in properties 240P. For example, a discovery directive, such as discovery directive 230 of FIG. 2A, can be run to discover information about a log for web server 240. When the discovery directive is run, the value of the information about the log (for example, a location of the log) is placed into the 'web log info' property. Application server 250 has properties 'application log info,' 'process list,' 'CPU load,' and so on, as shown in properties 250P. RDBMS 260 has properties 'avg. transaction time,' 'num. transactions/hour,' and so on, as shown in properties 260P.

Figure 3A:
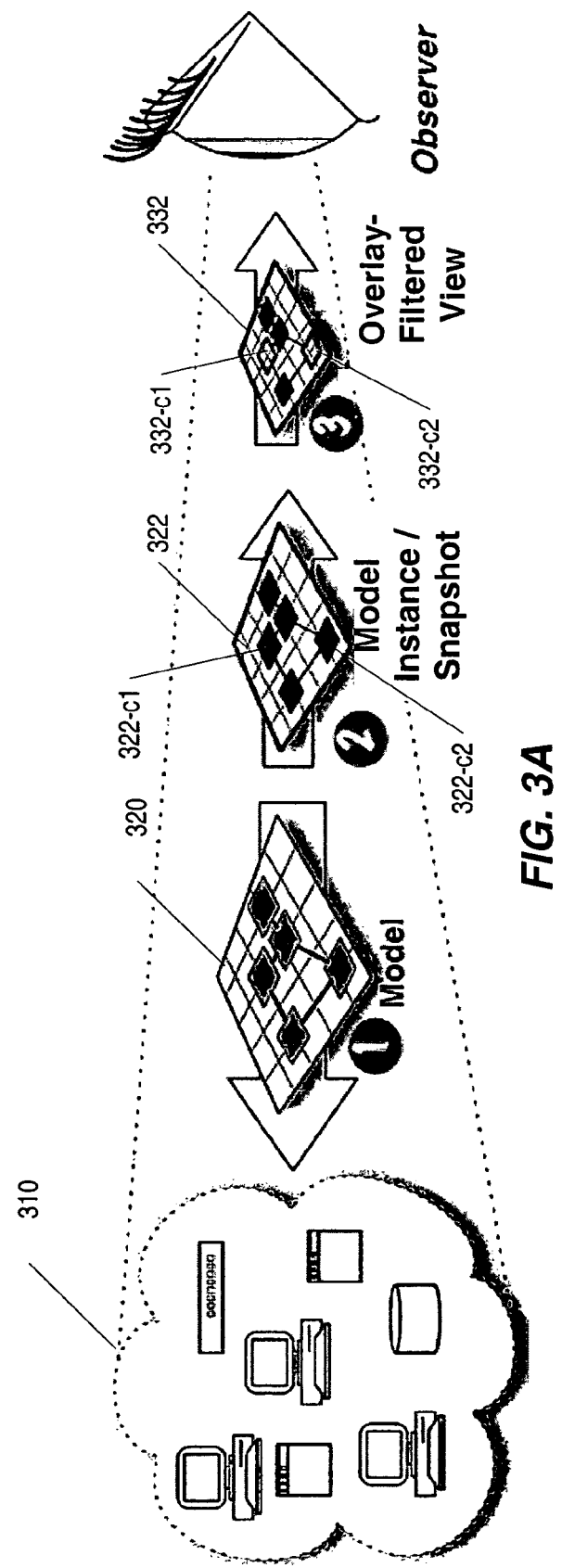
FIG. 3A shows a view of a snapshot using an overlay.

FIG. 3A shows a view of a snapshot filtered using an overlay (not shown). In FIG. 3A, information processing system 310 is viewed via model 320 as model instance/snapshot 322, which is presented as overlay-filtered view 332. An overlay can be considered to be one or more operational conditions or constraints and one or more actions tied to properties or relationships described by a model, such as model 320. An overlay provides an analysis of data about the environment, here information processing system 310. For example, an overlay could be used to analyze model instance/snapshot 322 being upgraded to a new version of a particular application program. If one component of model instance/snapshot 322 must be upgraded, other components interacting with the upgraded component may also need to be upgraded. The overlay can, for example, identify the components that must be upgraded and highlight those components to the user as part of overlay-filtered view 332. In an alternative embodiment, only the components needing an upgrade are presented.

Such a scenario is presented in FIG. 3A. Model instance/snapshot 322 includes five components, two of which are labeled as components 322-c1 and 322-c2. When model instance/snapshot 322 is filtered via an upgrade overlay, overlay filtered view 332 displays those two components differently, shown as components 332-c1 and 332-c2. Here the components needing upgrade are highlighted. Elements that do not require an upgrade are not highlighted in overlay-filtered view 332.

Figure 3B:
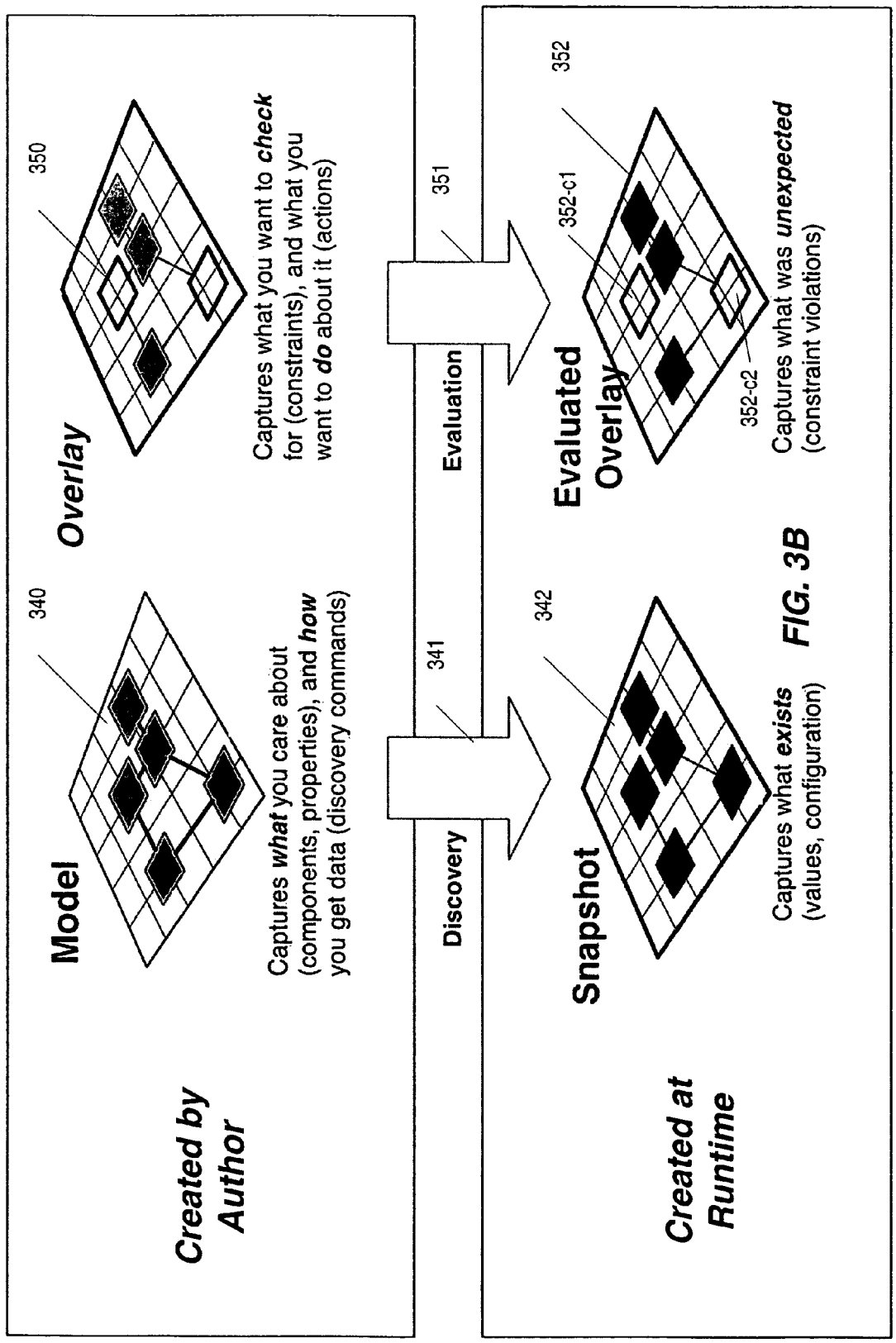
FIG. 3B is a diagram to show the differences between a model and a snapshot and differences between an overlay and an evaluated overlay.

FIG. 3B is a diagram to show the differences between a model and a snapshot and the differences between an overlay and an evaluated overlay. Models are created by an author; for example, an expert in an application program may create a model of the application program and an information processing system that runs that application program. The author defines the components of the model, properties of components, and a set of discovery instructions to obtain data about resources in an existing information processing system corresponding to particular components. When a set of discovery instructions defined in model 340 is run (represented by arrow 341 labeled 'discovery') in an existing information processing system, values for the properties and the configuration of resources corresponding to the components are obtained from the existing information processing system, represented here by snapshot 342.

Overlays are also created by an author and are related to a particular model. As noted above, an overlay can be considered to be one or more operational conditions or constraints, also referred to as rules, and one or more actions tied to properties or relationships described by a model. For example, the expert that created the model may also create an overlay, or another expert in a particular functionality may create an overlay specific to that particular functionality in the model. The rules define the constraints that are to be checked in the resource corresponding to a given component of the model. The rules are evaluated for an existing information processing system, here represented by snapshot 342. For example, when overlay 350 is used to evaluate snapshot 342, evaluated overlay 352 is produced. An evaluated overlay can be considered to be the results of using an overlay (here overlay 350) to analyze an information processing system's snapshot (such as snapshot 342). Actions are defined in the overlay to specify the functionality to be performed given conditions related to a rule (constraint). When the conditions are violated according to information discovered from the existing information processing system, the actions defined in the overlay are performed, as shown here by evaluation arrow 351. In evaluated overlay 352, components 352-c1 and 352-c2 are highlighted, as described above with reference to FIG. 3A. In this example, components that are highlighted show components violating a constraint.

Figure 4:
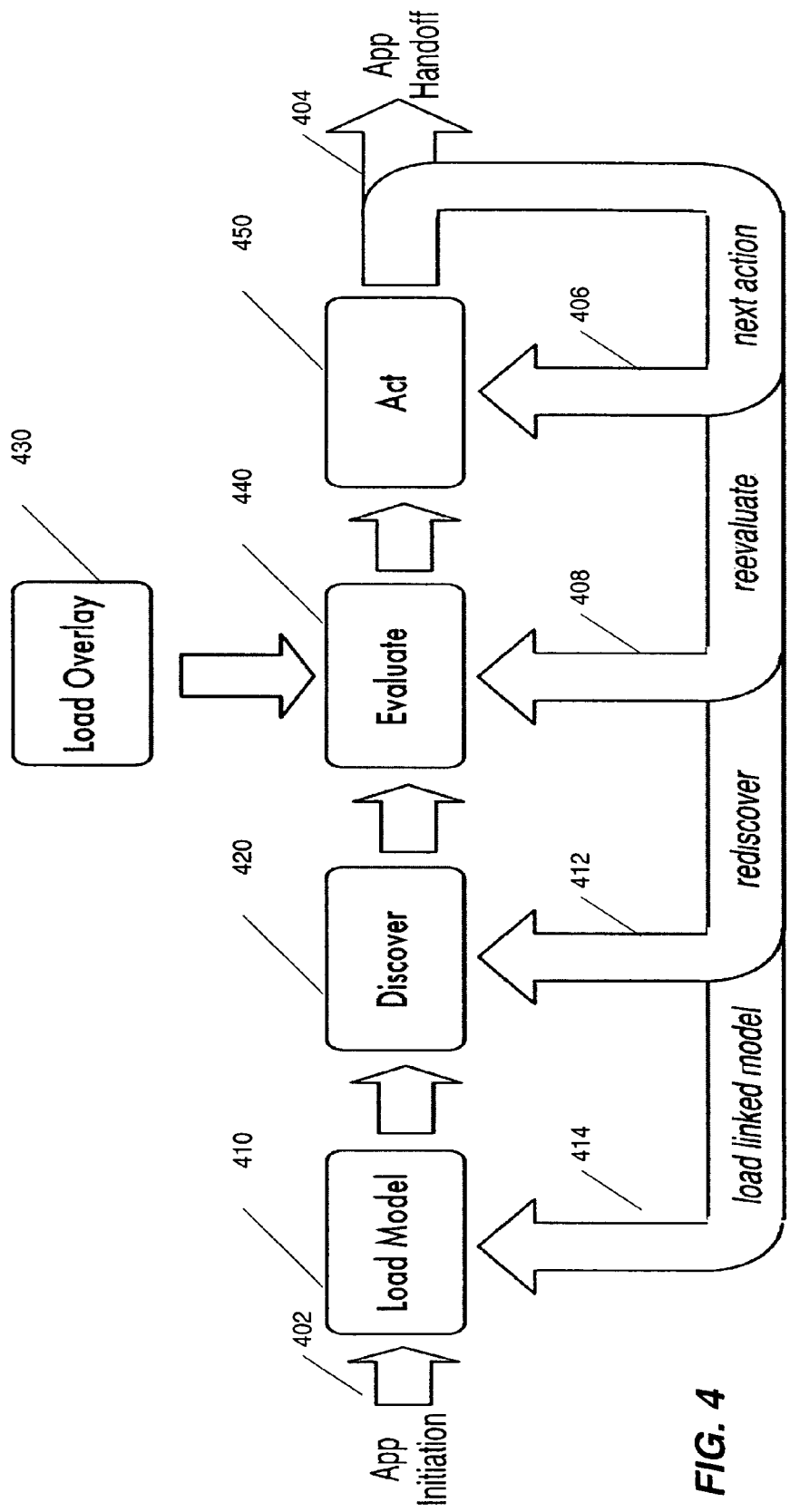
FIG. 4 is a flow diagram showing actions taken by a model-guided application in accordance with the present invention.

FIG. 4 is a flow diagram showing actions taken by a model-guided application in accordance with the present invention. Upon initiation of the model-guided application, as shown by arrow 402, control proceeds to "Load Model" step 410. The model is loaded, components are identified, set(s) of discovery instructions for the components are obtained, and control proceeds to "Discover" step 420. In "Discover" step 420, the set(s) of discovery instructions are executed to discover data about resources in an existing information processing system, where the resources correspond to the components of the model. When the data about the resources is obtained, control proceeds to "Load Overlay" step 430, where an overlay is loaded to evaluate a set of conditions that might exist in an existing information processing system. Control proceeds to "Evaluate" step 440, where the overlay is evaluated using the data obtained during discovery. Based upon resource conditions discovered during evaluation of the overlay, actions are identified. Control proceeds to "Act" step 450, where those actions are performed.

Several different types of actions are illustrated in FIG. 4. Arrow 404 illustrates that the action may include handing off control to the model-guided application, which provides application-specific functionality. Arrow 406 shows a 'next action,' indicating that a series of actions may be taken in response to evaluating the overlay. Arrow 408 shows re-evaluation of the overlay, arrow 412 shows re-discovery of data about the resources in the existing information processing system, and arrow 414 shows loading a model linked to the model most recently loaded in "Load Model" step 410. A linked model can be, for example, a model containing more detailed specification of particular components of the model originally loaded.

Figure 5:
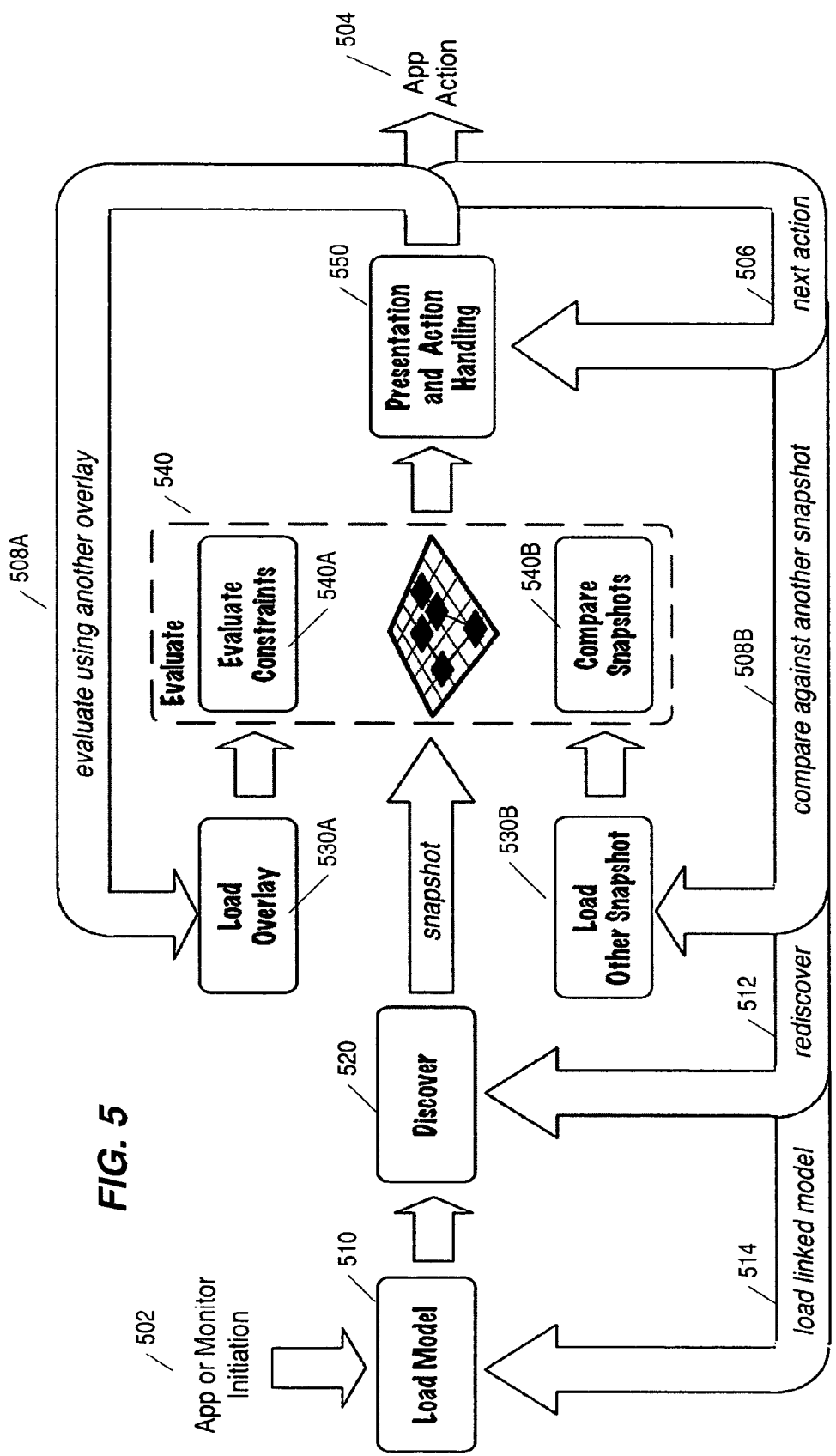
FIG. 5 is another flow diagram showing actions taken by a model-guided application in accordance with the present invention.

FIG. 5 is another flow diagram showing actions taken by a model-guided application in accordance with the present invention. Upon initiation of the application or monitoring program, as shown by arrow 502, control proceeds to "Load Model" step 510. The model is loaded, components are identified, sets of discovery instructions for the components are obtained, and control proceeds to "Discover" step 520. In "Discover" step 520, the sets of discovery instructions are executed to discover data about resources in an existing information processing system, where the resources correspond to the components of the model.

When data about the resources is obtained in the form of a snapshot, control proceeds to either "Load Overlay" step 530A, where an overlay to evaluate a particular functionality of the existing information processing system is obtained, or to "Load Other Snapshot" step 530B, where another snapshot is loaded for comparison against the snapshot of the existing information processing system. For example, the other snapshot may be an historical snapshot taken at a previous point in time to monitor changes in the existing information processing system. From either step 530A or 530B, control proceeds to "Evaluate" step 540, wherein either one or both of steps 540A and 540B may be performed. In "Evaluate Constraints" step 540A, the overlay loaded in "Load Overlay" step 530A is executed using the data obtained during discovery. In "Compare Snapshots" step 540B, the current snapshot is compared to the snapshot loaded in "Load Other Snapshot" step 530B. Based upon resource conditions discovered during "Evaluate" step 540, actions are identified. Control proceeds to "Presentation and Action Handling" step 550, where those actions are performed.

Several different types of actions are illustrated in FIG. 5. Arrow 504 illustrates that the action may include an action performed by the model-guided application. Arrow 506 shows a 'next action,' indicating that a series of actions may be taken in response to "Evaluate" step 540. Arrow 508A shows evaluation using another overlay, and arrow 508B shows comparing the snapshot to another snapshot. Arrow 512 shows re-discovery of data about the resources in the existing information processing system, and arrow 514 shows loading a model linked to the model most recently loaded in "Load Model" step 510. A linked model can be, for example, a model to guide functionality performed by particular components of the model originally loaded.

Figure 6:
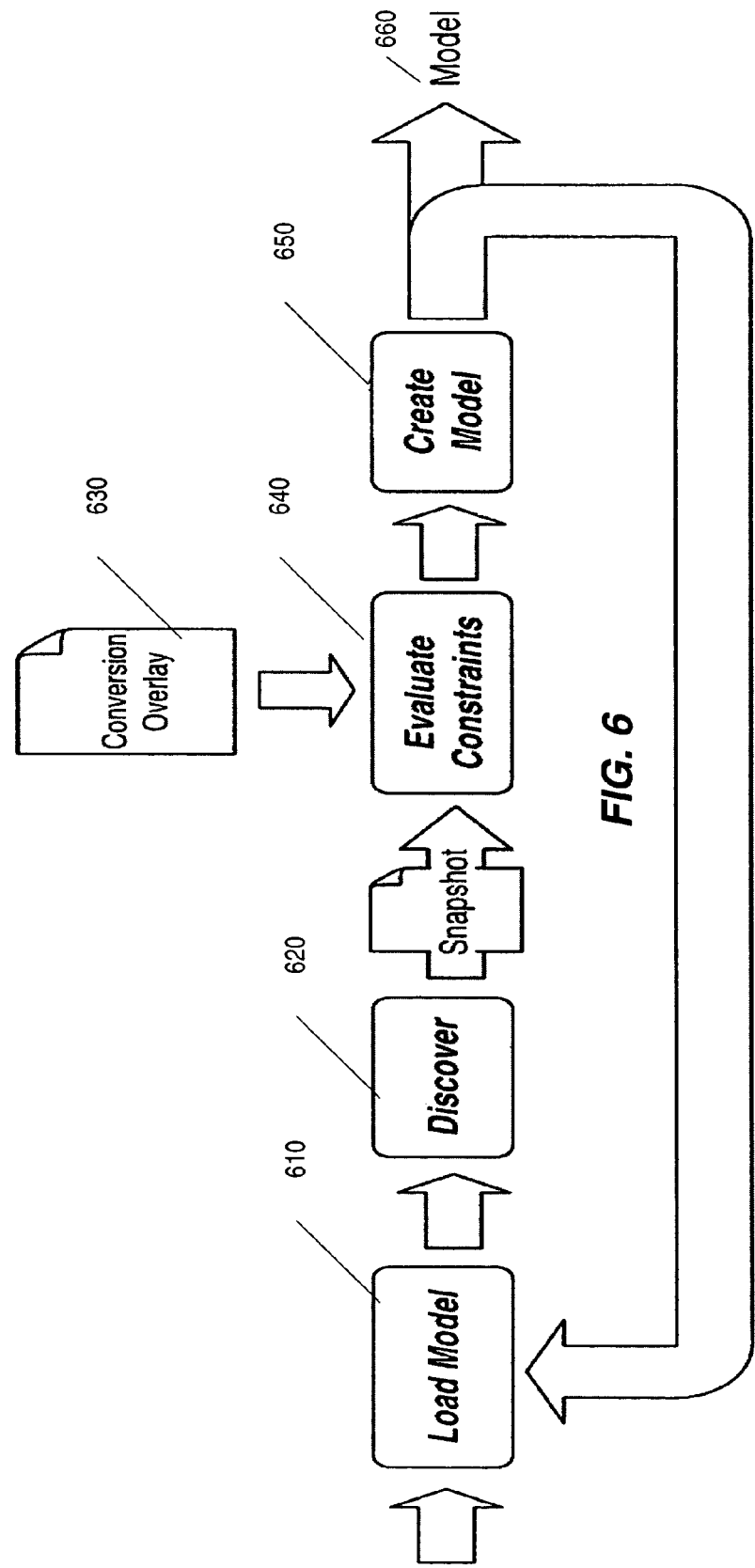
FIG. 6 is a flow diagram showing discovery-assisted modeling in accordance with the present invention.

FIG. 6 is a flow diagram showing discovery-assisted modeling in accordance with the present invention. The steps in FIG. 6 are similar to those previously described with reference to FIGS. 4 and 5, which dealt with model-guided applications. As with model guided applications, in discovery-assisted modeling, a user can perform several iterations of loading models in "Load Model" step 610, performing discovery in "Discover" step 620, loading an overlay such as overlay 630, and evaluating constraints in "Evaluate Constraints" step 640. In discovery-assisted modeling, a user can adjust an existing model and/or create a new model in conjunction with an iterative discovery process, as shown by "Create Model" step 650. The output of the process is a model 660.

As an example of discovery-assisted modeling, a general network model may be loaded first, and discovery performed via TCP/IP detection of devices on the network. Another model may be loaded to perform primitive discovery of each device, thereby identifying hardware, operating systems, and software providing basic capabilities. More advanced discovery may be performed to identify components of particular application programs supported in the information processing system. As each iteration of discovery is performed, a conversion overlay may be run to evaluate constraints. The resulting evaluated overlay may provide insight to the user in constructing an additional model of a sub-system within the existing information processing system.

Figure 7:
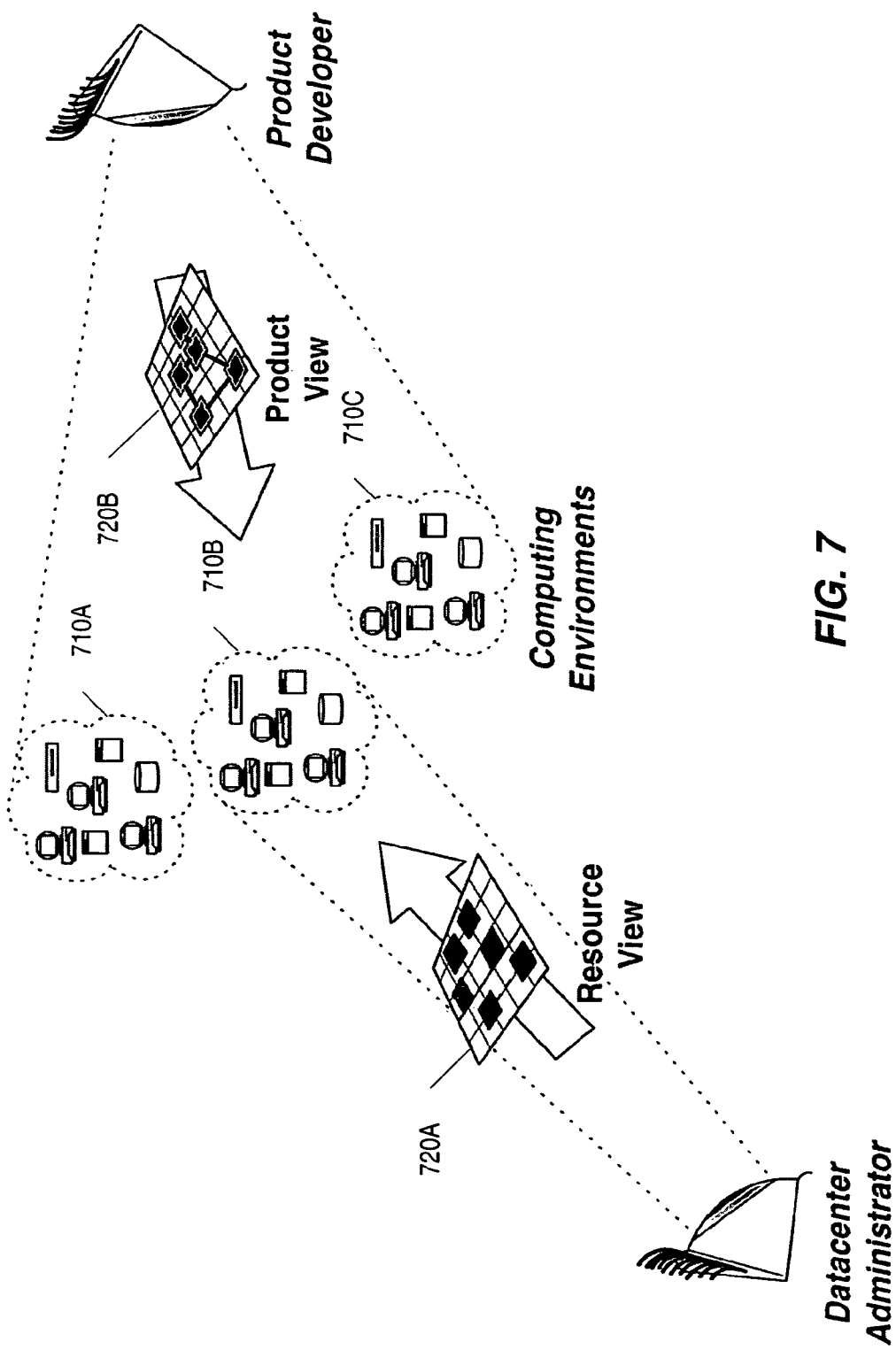
FIG. 7 shows a resource view of a given environment and a product view of the same environment.

FIG. 7 shows a resource view 720A of a given environment and a product view 720B of the same environment. As mentioned earlier with reference to FIG. 1A, a model provides a perspective on a given computing environment. A resource view is a view of the resources available in one particular computing environment, without regard to the particular roles each resource may serve within the information processing system. A product view represents a particular configuration of functionality for a particular application program or information processing system. When viewing the environment as resource view 720A, the datacenter administrator sees a set of resources. When viewing the environment as product view 720B, the product developer sees three different computing environments 710A, 710B, and 710C, which may correspond to three installations of a given product modeled by model 720B.

Figure 8:
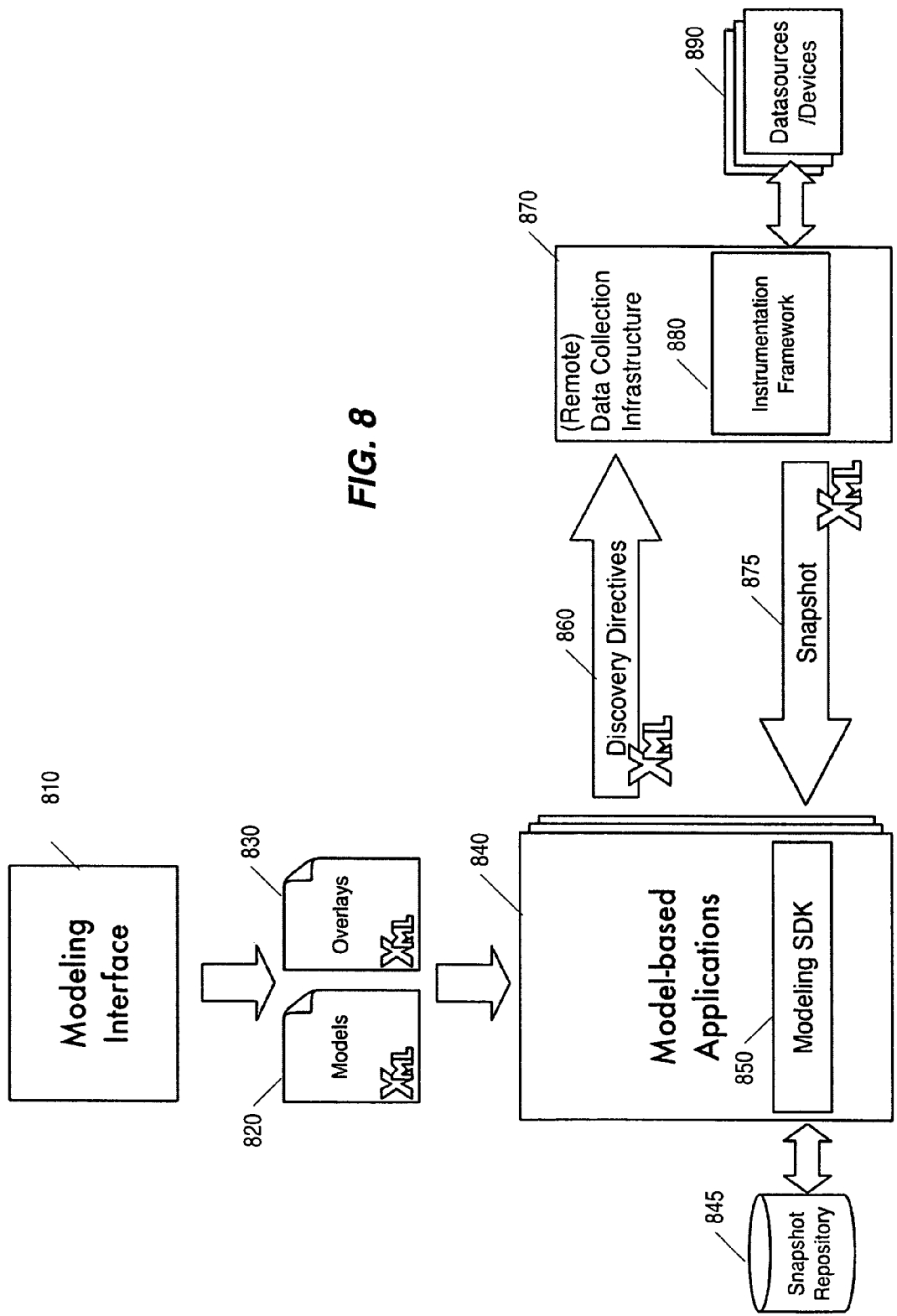
FIG. 8 is a data flow diagram showing data flows between a one embodiment of a modeling interface, model-based applications, and a data collection infrastructure in accordance with the present invention.

FIG. 8 is a data flow diagram showing data flows between a modeling interface 810, model-based applications 840, and remote data collection infrastructure 870 in accordance with the present invention. Modeling interface 810 provides an interface to define a model (such as one of models 820) of an information processing system as well as to define a set of instructions operable to discover data about a resource in an existing information processing system. As such, modeling interface 810 can be considered to be a providing module, means, and/or instructions as well as a defining module, means, and/or instructions to define a set of instructions to discover data about a resource. Modeling interface 810 can be considered to be a defining module, means, and/or instructions for defining a set of components, properties of components, and relationships between components. Modeling interface 810 obtains models 820 and overlays 830. One of skill in the art will recognize that XML is one format in which models 820 and overlays 830 can be input to and/or output from modeling interface 810, although other formats are also within the scope of the invention. Models 820 and overlays 830 are input to model-based applications 840, which may include elements provided by a modeling software development kit (SDK) 850. Modeling interface 810 may also include components of a modeling SDK (not shown in FIG. 8). Model-based applications 840 may obtain snapshots from snapshot repository 845. Model-based applications 840 and modeling SDK 850 are described further with reference to FIGS. 9 and 10 below.

Models 820 can include discovery directives, which are sets of instructions to discover data about a resource in an information processing system. Discovery directives 860 are provided by model-based applications 840 to remote data collection infrastructure 870, which may also contain elements provided by instrumentation framework 880. Remote data collection infrastructure 870 collects data from data sources/devices 890. Remote data collection infrastructure 870 provides snapshots, as shown by arrow 875, to model-based applications 840. While remote data collection infrastructure 870 can be used to collect data from remote data sources and/or devices, it is not a requirement that the data sources and/or devices are remote from model-based applications 840.

Figure 9:
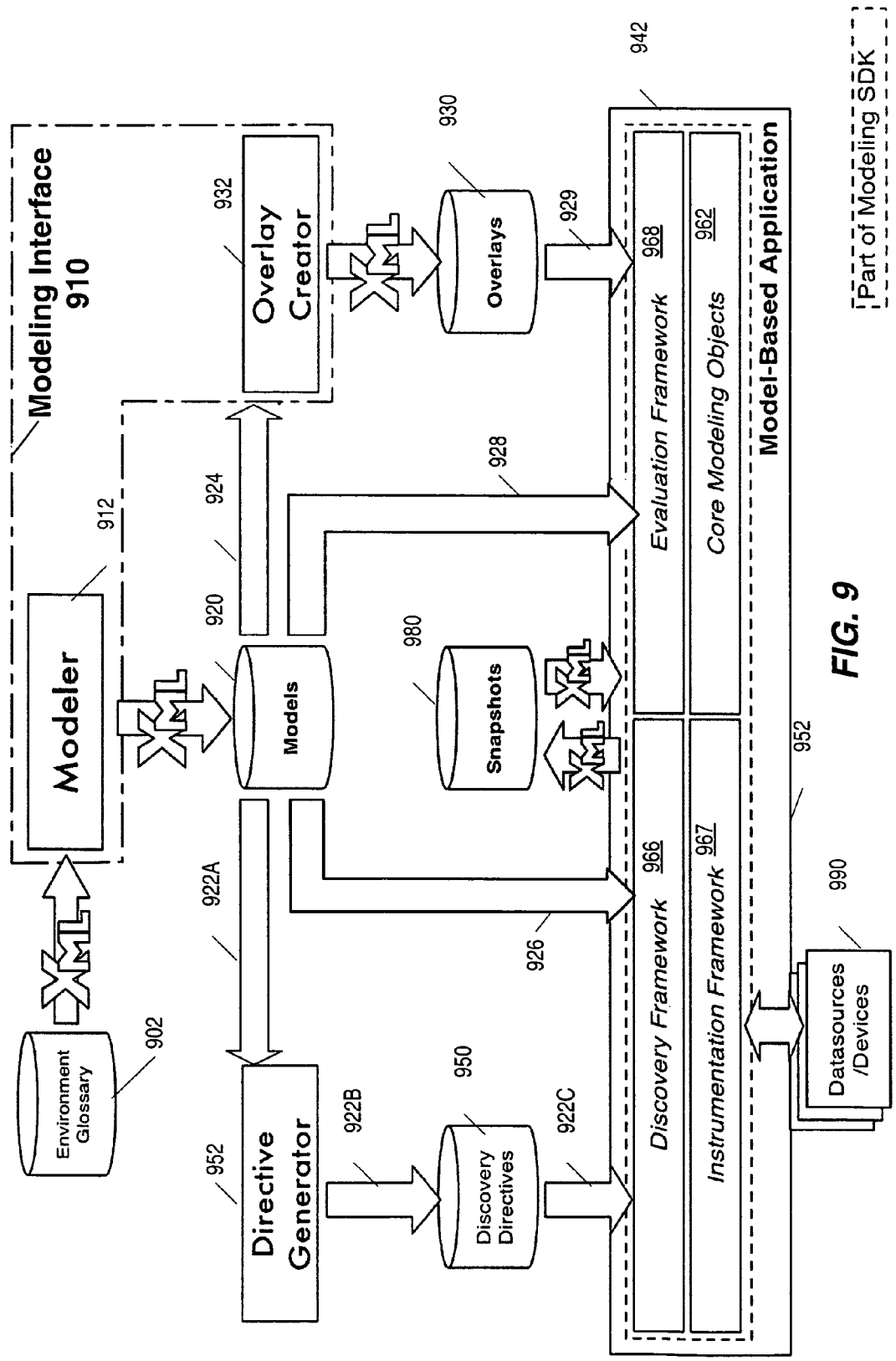
FIG. 9 is a more detailed data flow diagram showing data flows between a modeling interface, which includes a modeler and an overlay creator, a model-based application, and a directive generator in accordance with one embodiment of the present invention.

FIG. 9 is a more detailed data flow diagram showing data flows between modeling interface 910, which includes modeler 912 and overlay creator 932; model-based application 942; and directive generator 952 in accordance with the present invention. Modeler 912 uses environment glossary 902 to obtain information such as data types, component types, and other pre-defined information about technology areas, problem spaces, and so on. Modeler 912 is used to create models 920; in this example, models 920 are created as XML documents, although models can be created in other formats. Modeler 912 can be considered to be a constructing module, means, and/or instructions for constructing a model as well as a refining module, means, and/or instructions for refining an existing model. Constructing a model and refining an existing model were previously discussed with reference to FIG. 6. Models 920 serve as input to directive generator 952, overlay creator 932, and model-based application 942.

The embodiment shown in FIG. 9 shows two possible implementations for obtaining discovery directives from models 920: directive generator 952, which resides outside model-based application 942, and discovery framework 966, which resides within model-based application 942. Models 920 can be obtained by directive generator 952, which extracts discovery directives 950 from models 920 and provides them to model-based application 942, as shown by arrows 922A, 922B, and 922C. Discovery directives 950 can be stored so that model-based application 942 can retrieve discovery directives from storage without the need to regenerate the discovery directives. Directive generator 952 is an example of an obtaining module, means, and/or instructions to obtain a set of instructions to discover data about a resource.

Models 920 also serve as direct input to model-based application 942. Model-based application 942 includes discovery framework 966 to obtain discovery directives, either by generating discovery directives directly or by reading discovery directives 950 from a data store. Discovery framework 966 is another example of an obtaining module, means, and/or instructions to obtain a set of instructions to discover data about a resource. Discovery framework 966 also produces snapshots 980.

Instrumentation framework 967 is used to perform discovery on data sources/devices 990. The functionality of discovery framework 966 and instrumentation framework 967 can be combined into a single module or separated into multiple modules providing different pieces of the functionality. For example, both discovery framework 966 and instrumentation framework 967 are examples of a causing module, means, and/or instructions to cause instructions to be executed to discover data about a resource. Discovery framework 966 and instrumentation framework 967 are also examples of an updating module, means, and/or instructions to update a snapshot of an existing information processing system.

Evaluation framework 968 takes as input models 920, as shown by arrow 928, and overlays 930, as shown by arrow 929. Evaluation framework 968 uses models 920 and overlays 930 to evaluate snapshots 980. Evaluation framework 968 is an example of an evaluating module, means, and/or instructions to evaluate data discovered about a resource. Evaluation framework 968 is also an example of a using module, means, and/or instructions to use the data discovered about a resource to identify a second model to be loaded to evaluate an existing information processing system.

Core modeling objects 962 include other elements of model-based application 942 that are provided as part of a software development kit, such as modeling SDK 850 of FIG. 8. A modeling SDK can be used to provide elements of discovery framework 966, instrumentation framework 967, evaluation framework 968, and/or modeler 912 of modeling interface 910 as well. Elements provided by modeling SDK 850 are described in further detail with reference to FIG. 10. Models 920 also serve as input to overlay creator 932, which is an interface for building overlays 930, as shown by arrow 924. Overlays 930 are also input to evaluation framework 968 of model-based application 942, as shown by arrow 929.

Figure 10:
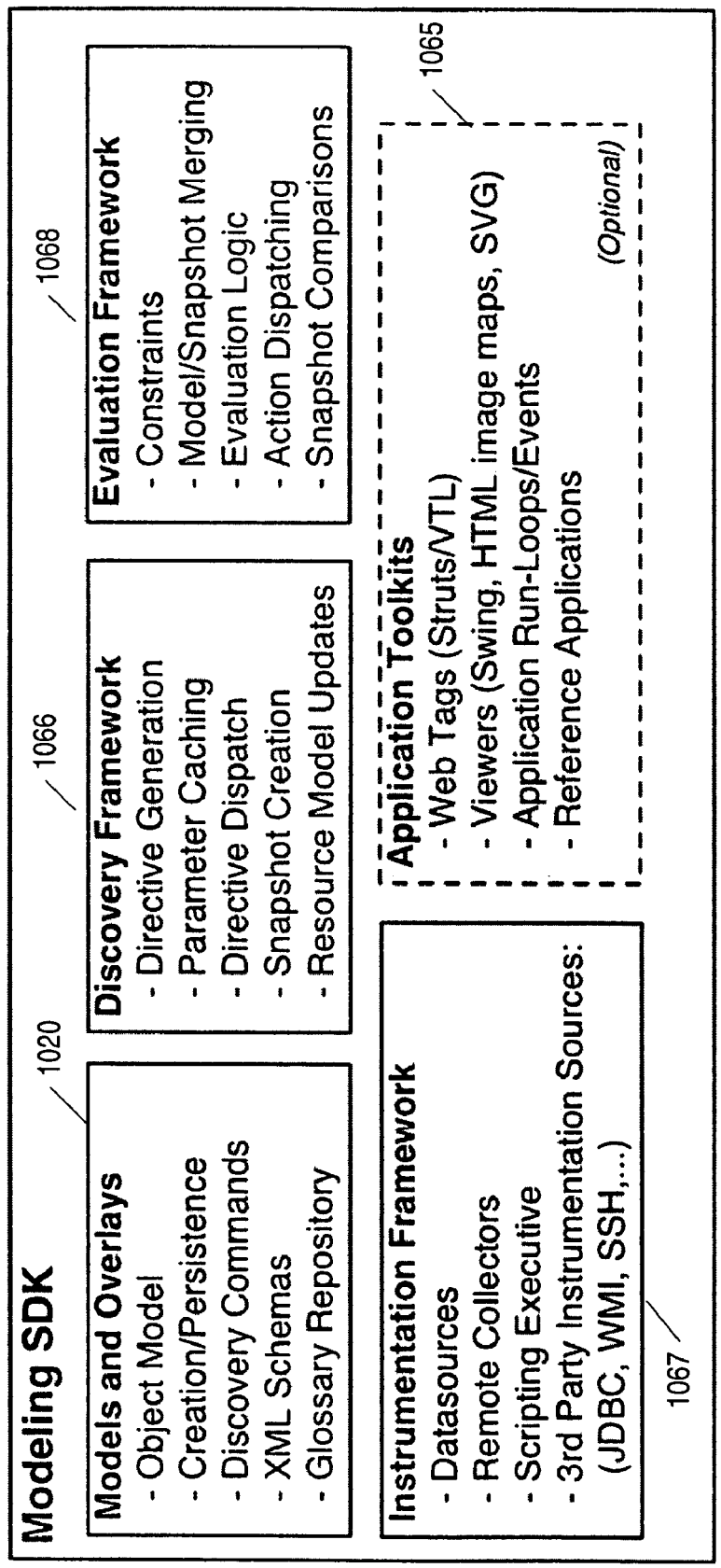
FIG. 10 is a block diagram illustrating the roles of models, overlays, a discovery framework, an evaluation framework, an instrumentation framework, and application toolkits at runtime in accordance with one embodiment of the present invention.

FIG. 10 is a block diagram illustrating the roles of models, overlays, a discovery framework, an evaluation framework, an instrumentation framework, and application toolkits at runtime in accordance with one embodiment of the present invention. At runtime, models and overlays 1020 involve using object models, creation and persistence APIs, sets of discovery instructions/commands, XML schemas, and a glossary repository. At runtime, discovery framework 1066 performs functions such as directive generation, parameter caching, directive dispatching, snapshot creation, and updating resource models. At runtime, evaluation framework 1068 performs functions such as determining constraints, merging models and snapshots, evaluating constraints in overlays, performing comparisons (e.g., of snapshots), and dispatching actions performed as a result of evaluating an overlay. In FIG. 10, instrumentation framework 1067 includes data source adapters, remote collectors of data, a scripting executive, and third party instrumentation sources. Application toolkits 1065 include optional tools such as web tags, viewers, application run-loops/events, and reference applications that can be used as building blocks in constructing model-based applications.

FIG. 11 shows an example implementation of an instrumentation framework in accordance with one embodiment of the invention. Referring back to FIG. 9, instrumentation framework 967 is used to perform discovery on data sources/devices 990. In FIG. 11, a directive set 1110 is provided to an instrumentation executive 1120, which is the process responsible for performing run-time discovery on data sources/devices. Instrumentation executive 1120 includes directive processor 1122, a response creation element 1124, a driver response handler 1126, and a dispatcher 1128. Directive processor 1122 obtains directive set 1110, and dispatcher 1128 determines one of pluggable datasource drivers 1130 to execute the directive. Pluggable datasource drivers 1130 include examples of drivers that can exist in an instrumentation framework, including remote java management extensions (JMX) driver 1132, a java archive (.jar); secure shell (SSH) driver 1134, an executable file (.exe); web-based enterprise management (WBEM) HTTP driver 1136, a data link library (.dll); and Remote Windows Script Host (RWSH) driver 1138, a Microsoft archive cabinet file (.cab). Each of pluggable datasource drivers 1130 can communicate across a network 1150 with a respective one of objects 1140 running on the device in question.

For example, JMX facilitates the centralized management of managed objects (called MBeans) which act as Java wrappers for applications, services, components, or devices in a distributed network. Remote JMX driver 1132 communicates with an MBeanManager object running on a respective data source/device. The MBeanManager object receives a directive from remote JMX driver 1132 and executes the directive via an example getFoo( ) function of an MBean object. Similarly, secure shell (SSH) driver 1134 executes a directive as a shell command; web-based enterprise management (WBEM) HTTP driver 1136 executes a directive as a common information model (CIM) operation; and Remote Windows Script Host (RWSH) driver 1138 executes a directive as a Windows management instrumentation (WMI) call. One of skill in the art will recognize that many other types of pluggable drivers and objects are within the scope of the invention, and that the examples given are for illustration purposes only.

Advantages of the present invention are many. The interface provided by the present invention enables the visualization and analysis of a complex information processing system. In particular, the interface provides the ability to define a set of discovery instructions that can be used to automatically discover data about a variety of heterogeneous information processing systems. By enabling automated discovery of data about existing information systems, the modeling process is much less time-consuming and can be targeted to a wide range of implementations of a given functionality.

Other Embodiments

The foregoing describes an embodiment wherein some components are contained within other components. It is to be understood that such depicted architectures are merely examples; in fact, many other architectures can be implemented that achieve the same functionality.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A computer-based method of defining a model of an information processing system, comprising:
 defining a set of discovery instructions configured to discover first snapshot data via a computer communications network about hardware and/or software resources within said information processing system, including a client and a server computer system, wherein said model:
  defines a set of components of said information processing system, the set being a subset of said resources needed to deploy an instance of an application,
  defines properties of said components, and
  provides said discovery instructions to said application to discover first said snapshot data about a state of said properties; and
 executing on a computer system a software program configured to provide visualization and analysis of said information processing system based on said first snapshot data wherein said analysis includes at least one of: loading and comparing a second snapshot data to said first snapshot data, loading an analysis overlay and using said analysis overlay to evaluate said first snapshot data.

2. The method of claim 1 further comprising:
 defining a relationship between a model of the client computer system and a model of the server computer system, and providing an instruction configured to discover data about said relationship.

3. The method as recited in claim 1, wherein each of the instructions is configured to request a specified datum associated with a specified one of said resources.

4. The method as recited in claim 1, wherein said discovery comprises communication by said computer system with said components over a TCP/IP network.

5. The method as recited in claim 1, wherein said model is implemented in Extensible Markup Language (XML).

6. The method as recited in claim 1, further comprising employing java management extension (JMX) drivers in said discovery.

7. The system as recited in claim 1, wherein said properties include attributes needed by the server to function as a database server.

8. The method as recited in claim 1, wherein said computer program is a model-based application configured to obtain a discovery first snapshot from a snapshot repository, said application being configured to issue said discovery instructions to a data collection infrastructure, and receive said first snapshot data therefrom.

9. A system comprising:
 a computer system configured to provide visualization and analysis of an information processing system; and
 a storage device configured to store a computer program executed by said computer system, wherein said computer program is configured to access a model that defines a set of discovery instructions configured to discover first snapshot data via a communications network about hardware and/or software resources within said information processing system, including a client and a server computer system, wherein said model:
  defines a set of components of said information processing system, the set being a subset of said resources required to run an instance of said computer program;
  defines properties of said components; and
  provides said discovery instructions to an application running on said computer system to discover and evaluate said first snapshot data about a state of said properties, said visualization and analysis based on said first snapshot data wherein said analysis includes at least one of: loading and comparing a second snapshot data to said first snapshot data, loading an analysis overlay and using said analysis overlay to evaluate said first snapshot data.

10. The system of claim 9 further comprising:
 instructions defining a relationship between a model of the client computer system and a model of the server computer system, and providing an instruction configured to discover data about said relationship.

11. The system of claim 9, wherein the model provides a context in which an information processing function is performed, said visualization and analysis includes evaluating a plurality of data to determine whether the server is suitable for performing the information processing function, and said evaluating the data determines whether the server can perform the information processing function in the context.

12. The method as recited in claim 9, wherein each of the instructions is configured to request a specified datum associated with a specified one of said resources.

13. The system as recited in claim 9, wherein said discovery comprises communication by said computer system with said components over a TCP/IP network.

14. The system as recited in claim 9, wherein said model is implemented in Extensible Markup Language (XML).

15. The system as recited in claim 9, further comprising employing java management extension (JMX) drivers in said discovery.

16. The system as recited in claim 9, wherein said computer program comprises a module configurable to provide an interface to define said model.

17. The system as recited in claim 9, wherein said properties include attributes needed by the server to function as a database server.

18. The system as recited in claim 9, wherein said computer program is a model-based application configured to obtain a discovery first snapshot from a snapshot repository, said application being configured to issue said discovery instructions to a data collection infrastructure, and receive said first snapshot data therefrom.

19. A computer-based method of defining an information processing system, comprising:
 defining a model of said information processing system and storing said model in a computer-readable storage medium, wherein said model:
  specifies a set of components that are configurable to deploy an instance of an application;
  specifies properties of said components; and
  includes discovery instructions to discover snapshot data about a state of said properties;
 executing a computer program that loads said model;
 providing said discovery instructions from said storage medium to said computer program;
 determining a first snapshot of said information processing system by said computer program using said discovery instructions to discover hardware and/or software resources that are present in said information processing system; and
 performing visualization and analysis of said information process based on said snapshot data wherein said analysis includes at least one of: loading and comparing a second snapshot data to said first snapshot data, loading an analysis overlay and using said analysis overlay to evaluate said first snapshot data.

* * * * *